(12) United States Patent
Rottmerhusen (10) Patent No.: US 8,541,963 B2
(45) Date of Patent: Sep. 24, 2013

(54) ELECTRODYNAMIC BRAKING DEVICE FOR A UNIVERSAL MOTOR

(75) Inventor: Hans Hermann Rottmerhusen, Tellingstedt (DE)

(73) Assignee: Robert Bosch GmbH, Stuttgart (DE)

( * ) Notice: Subject to any disclaimer, the term of this patent is extended or adjusted under 35 U.S.C. 154(b) by 201 days.

(21) Appl. No.: 13/254,476

(22) PCT Filed: Mar. 2, 2010

(86) PCT No.: PCT/EP2010/052624
§ 371 (c)(1),
(2), (4) Date: Sep. 2, 2011

(87) PCT Pub. No.: WO2010/105903
PCT Pub. Date: Sep. 23, 2010

(65) Prior Publication Data
US 2011/0316456 A1  Dec. 29, 2011

(30) Foreign Application Priority Data

Mar. 3, 2009 (DE) .......................... 10 2009 011 448
Apr. 21, 2009 (DE) .......................... 10 2009 018 238

(51) Int. Cl.
*H02P 3/22* (2006.01)
*H02P 3/14* (2006.01)
*H02P 25/14* (2006.01)

(52) U.S. Cl.
USPC .......................... 318/375; 318/381; 318/273

(58) Field of Classification Search
USPC ................. 318/273, 280, 245, 246, 362, 375, 318/379, 381, 759
See application file for complete search history.

(56) References Cited

U.S. PATENT DOCUMENTS

| 5,552,686 | A | * | 9/1996 | Schmid et al. | 318/362 |
| 5,708,333 | A | * | 1/1998 | Kirn | 318/246 |
| 5,861,724 | A | * | 1/1999 | Ackerson | 318/376 |
| 5,969,303 | A | * | 10/1999 | Piserchia et al. | 187/297 |
| 6,013,993 | A | * | 1/2000 | Barbisch | 318/379 |

(Continued)

FOREIGN PATENT DOCUMENTS

| DE | 3428032 |    | 1/1986 |
| DE | 3428032 | A1 * | 1/1986 |

(Continued)

OTHER PUBLICATIONS

PCT/EP2010/052624 International Search Report.

*Primary Examiner* — Eduardo Colon Santana
(74) *Attorney, Agent, or Firm* — Michael Best & Friedrich LLP (57) ABSTRACT

The invention relates to an electrodynamic braking device and to a method for braking a universal motor having a field winding and an armature. The universal motor can be switched from a motor mode to a braking mode. In the motor mode, the armature and the field winding are supplied with an alternating current of a power grid. In the braking mode, the armature is short-circuited and the field winding continues to be supplied with an alternating current from the power grid. In a first phase of the braking mode, the field winding can be supplied with an alternating current having the frequency of the power grid. In a further phase of the braking mode, the field winding is supplied by the power grid with an alternating current having a frequency that is reduced with respect to the frequency of the power grid.

24 Claims, 8 Drawing Sheets

(56) References Cited

U.S. PATENT DOCUMENTS

| | | | |
|---|---|---|---|
| 6,236,173 B1 | 5/2001 | Meyer | |
| 6,448,727 B1* | 9/2002 | Rotterhusen | 318/375 |
| 6,680,596 B1* | 1/2004 | DeCicco | 388/819 |
| 6,998,804 B2 | 2/2006 | Meyer et al. | |
| 7,071,645 B2 | 7/2006 | Hahn et al. | |
| 7,075,257 B2* | 7/2006 | Carrier et al. | 318/375 |
| 2004/0207351 A1* | 10/2004 | Hahn et al. | 318/379 |
| 2008/0077285 A1* | 3/2008 | Kumar et al. | 701/19 |
| 2012/0091932 A1* | 4/2012 | Rottmerhusen | 318/381 |

FOREIGN PATENT DOCUMENTS

| | | |
|---|---|---|
| DE | 3825835 A1 | 2/1990 |
| DE | 19932742 C1 | 9/2000 |
| EP | 1044921 A2 | 10/2000 |
| WO | 9103869 | 3/1991 |
| WO | 2005031963 | 4/2005 |

* cited by examiner

ELECTRODYNAMIC BRAKING DEVICE FOR A UNIVERSAL MOTOR

BACKGROUND OF THE INVENTION

The invention relates to an electrodynamic braking device for a universal motor and to a method for braking a universal motor.

Electrodynamic braking devices are known in a variety of configurations.

The German patent publication DE 38 25 835 A1 describes an electric braking device for a series-wound motor having a field winding and an armature and having a circuit arrangement including a phase-angle control, wherein during the braking mode the field winding is fed from the power grid and the armature is short-circuited.

The braking device is specified for a centrifuge, whereby the braking torque is to be held constant over the entire speed range. The braking torque is controlled by a control device dependent on the rotational speed, wherein a current is produced in the exciter winding of the electric motor, which is inversely proportional to the rotational speed of said electric motor. Furthermore, a braking resistor is connected in series with the armature during the braking mode.

The German patent publication DE 102 34 397 A1 describes a braked series-wound motor and a method for braking the series-wound motor, according to which said series-wound motor is operated as a conventional series-wound motor in the motor mode, wherein means for switching to the braking mode allow for a bypassing of the armature and a separate excitation of the field winding by means of the supply voltage; thus enabling the motor in the braking mode to be operated as a separately excited DC generator.

The German patent publication DE 199 32 742 C1 discloses a further braking device.

SUMMARY OF THE INVENTION

The aim of the invention consists of providing an improved electrodynamic braking device and an improved method for braking a motor, in particular for braking a universal motor.

The aim of the invention is met by means of the electrodynamic braking device. An advantage of the braking device and the method is that an improved braking of the armature is achieved, whereby damage to the electrical contacts is prevented.

This is achieved by the fact that the frequency of the braking current is higher in a first phase of the braking mode than in a further phase of said braking mode. In this way, a fast and gentle deceleration of the armature is achieved. The field winding is preferably supplied with an alternating current having the frequency of the power grid in the first phase of said braking mode. In an ensuing further phase of said braking mode, the field winding is supplied with an alternating current which has a lower frequency than the alternating current in said first phase.

Advantageous modifications to the electrodynamic braking device or to the method for braking a motor are stated in the dependent claims.

The advantages of the invention are seen among other things by the fact that a gentle, fast deceleration of the universal motor with an associated long service life of the brushes is achieved without a polarity reversal of the field winding. The armature is short-circuited during the braking mode and the field winding is excited from the grid, i.e. from the power grid, by a special control. The gentle, fast deceleration is achieved with the aid of a simple circuit and a particular method, whereby the electrodynamic braking device can be cost effectively produced.

The method is furthermore advantageous by virtue of the fact that brush sparking is reduced at the collector of the armature, whereby the chance for a damaging increase in the length of the electric arc at the collector is reduced or prevented.

In a modification to the braking device, said braking device comprises an apparatus, which is designed in the further phase to supply the field winding with half-cycle packets consisting in each case of a plurality of voltage pulses of the same polarity, wherein the polarity of the voltage pulses changes from half-wave packet to half-wave packet. In a simple manner, the field winding is thereby supplied with an alternating current having a frequency that is reduced with respect to the frequency of the power grid.

In a further embodiment, the device is designed to apply the voltage pulses of the at least first half-wave packet to the field winding without current limiting. In this way, a cost effective embodiment of the braking device is achieved.

In a further embodiment, the device is designed to control the current of the voltage pulses of the half-wave packets as a function of predefined parameters. In this way, an improved deceleration is achieved. Particularly a predefined current through the field winding and/or a predefined rotational speed of the motor can be used as parameters.

In a further embodiment, the device is designed to reduce the current of the voltage pulses from voltage pulse to voltage pulse in at least one half-wave packet in temporally consecutive voltage pulses. In this way, a fast deceleration at the end of the braking mode is achieved without stressing the contacts of the armature.

In a further embodiment, the device is designed to control the current through the field winding in an open- or closed-loop manner during the first phase of the braking mode using a current set point curve particularly in conjunction with a phase-angle curve. In this way a precise adaptation of the current to a desired current set-point curve is achieved. The manipulation of the current set point with the aid of a phase control angle curve represents a simple and cost effective implementation.

In a further embodiment, the device is designed to implement the switching from the motor mode to the braking mode such that a zero crossing of the alternating current of the power grid occurs during switching; thus enabling a first half-wave of the braking mode to have an opposite polarity with respect to a last half-wave of the motor mode. In this way, wear of the contacts is additionally limited.

In a further embodiment, the device is designed to change the polarity of the first half-wave of the braking mode when consecutive braking modes occur. This measure also reduces the stress on the brushes of the collector.

In a further embodiment, the device is designed to set up at least two periods having different levels of current through the field winding in the first phase of the braking mode. In this way, a gentle deceleration of the armature is achieved.

In a further embodiment, the device is designed to adjust a current through the field winding which slightly increases with time in an initial period of the first phase, to adjust a current through the field winding in a succeeding second period which more sharply increases with time than in the first period, to adjust a current through the field winding in a succeeding third period of the first phase which more sharply increases than in the second period and to preferably achieve a rotational speed curve of the armature which drops off linearly. Experiments have shown that a gentle deceleration of the motor is achieved with the aid of this procedural approach.

In a further embodiment, the device is connected to a switching member via a detection link for the purpose of detecting a motor mode or a braking mode. With the aid of the detection link, an electrically conductive connection between the armature and the field winding and the armature and/or the field winding and the power grid can be established or interrupted. With the aid of said detection link, the device can reliably detect a motor mode or a braking mode.

In a further embodiment, the device has at least one switching device, particularly a switching member, with which an electrically conductive connection can be established or interrupted between the terminals of the armature and/or between the armature and the field winding and/or between the armature and/or the field winding and the terminals of the power grid in order to switch from the motor mode to the braking mode, wherein the switching devices have a switching delay of at least one half-wave of the alternating current of the power grid. In this way, a safe and reliable switching between the motor mode and the braking can occur.

In a further embodiment, the device comprises control electronics, wherein said control electronics are connected during the motor mode via a detection link directly to a terminal of the power grid by a switching member, or are connected via a switching member and the field winding to a terminal of said power grid, wherein the armature is bilaterally disconnected from said power grid by two switching members after switching from the motor mode to the braking mode and wherein the field winding is disconnected from said power grid by an additional switching device after the braking mode has ended. In this way, a safe and reliable switching between motor mode, braking mode and final separation of the motor from the power grid is achieved.

In a further embodiment, three additional switching devices are provided for a bilateral mechanical separation of the armature, wherein during the motor mode, a first switching device is connected in series with the universal motor via a first change-over switch, wherein during the braking mode, a second switching device is connected in series with the field winding via a second change-over switch and wherein a third switching device is connected in a short-circuit bridge between the terminals of the armature.

The switching devices can, for example, be embodied in the form of controllable AC switches, as, e.g., triacs or other types of controllable switches. The switching devices are turned on and off by the control electronics.

BRIEF DESCRIPTION OF THE DRAWINGS

The invention is subsequently explained in detail with the aid of the drawings.

The following are shown.

DETAILED DESCRIPTION

Electric hand-held tools, which are equipped with a dangerous implement, as hand-held circle saws and angle grinders, have been decelerated up until now with a mechanical brake or with a electronic braking device.

A mechanical brake has in particular the disadvantage of being subject to a significant amount of wear, and said brake consequently requires maintenance. In the case of electronic braking devices known from prior art, a significant disadvantage is that the brushes and the collector of universal motors, which are typically in use, are subject to a high amount of wear.

FIGS. 1 to 4 show respectively a circuit arrangement for a universal motor, with which a power grid dependent short-circuit braking can be implemented without subjecting the brushes to a significant amount of wear.

Figure 1:
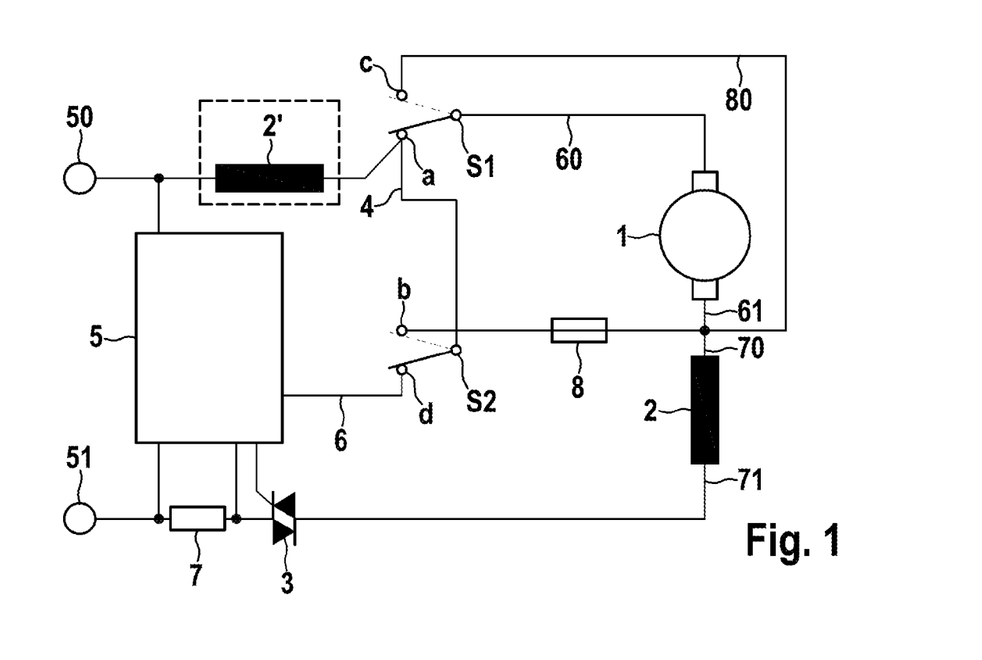
FIGS. 1 to 4 circuit arrangements of the electrodynamic braking device for a universal motor.

FIG. 1 shows a circuit arrangement, in which a first grid terminal 50 of the power grid is connected to the motor mode contact a of a first switching member 51, a first terminal 60 of an armature 1 is connected to the first switching member 51, a second terminal 61 of the armature 1 is connected to a first terminal of a field winding 2 and a switching device in the form of a triac 3 is connected between a second terminal of the field winding and a second grid terminal 51. The second terminal 61 of the armature 1 and the first terminal 70 of the field winding 2 are connected to a braking mode contact b of a second switching member S2 and to a braking mode contact c of the first switching member 51, wherein the second switching member S2 is connected to the motor mode contact a of the first switching member S1 via a bridge circuit 4. The braking mode contact c is connected to the connecting cable of the armature 1 and to the field winding 2 via a further electrical cable 80. A detection contact d of said second switching member S2 is connected to the control electronics 5 by a cable 6. The switching members S1, S2, which, for example, are actuated by a switch or feeler, preferably have a switching delay corresponding to m a time duration of a half-wave of the alternating current of the power grid, so that a reliable switching from the motor mode to the braking mode is assured.

The armature 1 is connected here on one side in series to the field winding 2. The armature can also be connected between two windings of the field winding, wherein a second field winding part 2' is then directly connected to the first power grid terminal 50.

A shunt 7, which is disposed between the triac 3 and the second grid terminal, is provided for a braking mode with closed-loop control and in the event of the electronic device malfunctioning, a fuse 8 can be connected in series to the field winding 2 during the braking mode.

The circuit arrangement of FIG. 1 can also be equipped merely with the second switching member S2, wherein the universal motor is then directly connected to the power grid on one side, and the first switching member S1 is therefore not needed. For safety reasons, the fuse 8 is then connected in series with the universal motor.

The operation of the electrodynamic braking device is as follows. If the motor mode is to be introduced, an apparatus switch, which is operatively connected to the switching members, is then actuated in a manner such that the first switching member S1 is closed to the motor mode contact a and the second switching member S2 is closed to the detection contact d. In this switching position of the switching members, the universal motor is activated for the motor mode and preferably runs up via a gentle acceleration, which is controlled by the control electronics 5 via the triac 3. The control electronics 5 comprise a program, for example a controller, with which the motor mode and the breaking mode are controlled.

If the motor is switched off by actuating an apparatus switch, the first switching member S1 is then closed to the braking mode contact c, and the second switching member S2 is closed to the braking mode contact b. The second terminal 71 of the field winding 2 is now directly connected to the second net terminal 51 via the triac 3, and the armature 1 is short-circuited via the braking mode contact c of the first switching member S1 and the cable 80. The opening of the detection contact d of the second switching member S2 is detected by means of a controller of the control electronics 5 and a program for the braking mode is activated, with which said control electronics 5 activate the triac 3 such that a current of a predetermined amount flows across the field winding 2. Instead of a triac, another type of controllable switch can be provided. The rotating, short-circuited armature 1 is correspondingly excited by an electric field present at the stator. Said field winding is impressed with a voltage by means of the control electronics 5 in such a way that only a slight brush sparking occurs and an effective deceleration is achieved. For this purpose, corresponding temporal courses for the voltage are available to the control electronics 5. The voltage is generated by the grid voltage of the power grid 50, 51.

If a reliable switching from the motor mode to the braking mode is to occur with an apparatus switch comprising non-delayed switching members, and the armature is hereby mechanically separated from the power grid on both sides, three controllable switches, for example triacs, are then required in this case.

Figure 2:
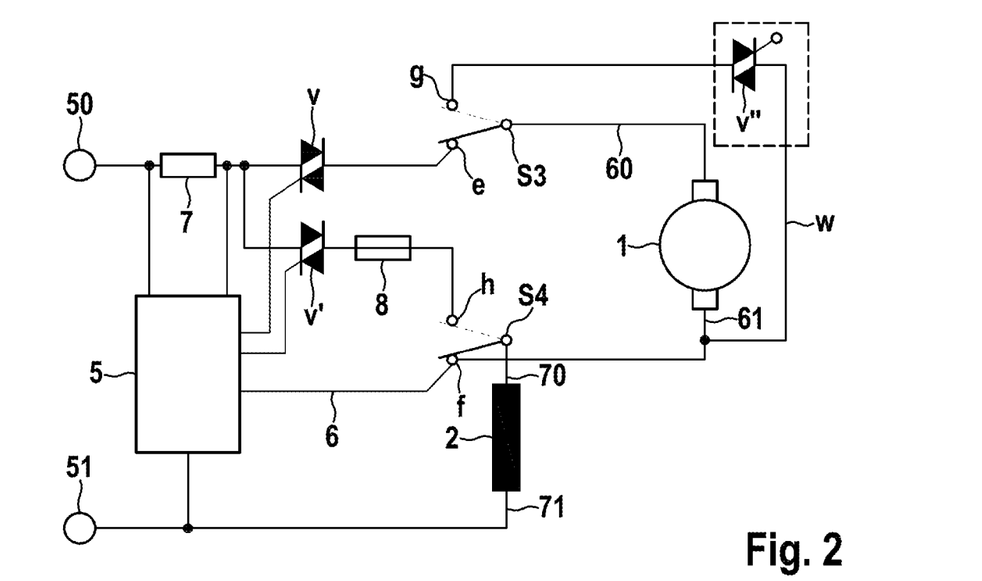

FIG. 2 shows such a solution. A first triac v is connected to a first power grid terminal 50 and to a motor mode contact e of a first switching member S3, and the first terminal 60 of the armature 1 connects to the first switching member S3, wherein the second terminal 61 of the armature is connected to a first detection contact f of a second switching member S4 and to a braking mode contact g of said first switching member S3, wherein the detection contact f is also simultaneously a motor mode contact. The first terminal 70 of the field winding 2 is connected to the second switching member S4, and the second terminal 71 of the field winding is connected up to the second power grid terminal 51, wherein a second triac v' is connected is connected to a braking mode contact h of the second switching member S4 and to the first grid terminal 50. In addition, the second terminal 61 of the armature 1 is connected to the braking mode contact g of the first switching member S3 via a bridge circuit W and a third triac v". The control electronics 5 are connected to the detection contact f via the cable 6. Instead of the three triacs, other types of controllable switches can be provided. The three triacs are controlled by the control electronics 5.

With this circuit arrangement, the armature is mechanically disconnected on both sides from the power grid by the switching members S3, S4 during the braking mode and in the off-position of the motor mode. A reliable switching from the motor mode to the braking mode is also not assured thereby because the last half-wave of the power grid of the motor mode can flow to the contacts of the switching members via an arc and directly over the field winding via the short-circuit bridge w of the armature. The first triac v consequently remains conductive until the next zero crossing, whereby a large current flow is induced across the field winding, which causes a substantial arc at the collector of the short-circuited armature, and this large current flow across the field winding can also trigger a power grid fuse. An arc at the switching contacts of the apparatus switch first expires when the next zero crossing of an alternating current occurs.

Provision is made for the third triac in order to prevent the last half-wave of the motor mode from being able to directly flow across the field winding when switching to the braking mode. This triac v" is connected into the short-circuit bridge w of the armature The circuit arrangement of FIG. 2 reveals that after switching from the motor mode to the braking mode, the armature 1 is bilaterally disconnected from the power grid by the two switching members S3, S4 and that the field winding 2 is disconnected from said power grid by the second triac v' after the braking mode has been completed. In the motor mode, the first switching member S3 is connected to the motor mode contact e and the second switching member S4 is connected to the additional braking mode contact h. A complete disconnection of the armature 1 from the power grid after switching to the braking mode can also occur if only one triac is arrayed. In this case, a two-pole change-over switch comprising delayed switching members of at least the time duration of a half-wave of the alternating voltage of the power grid, which is provided by the grid terminals 50, 51.

Figure 3:
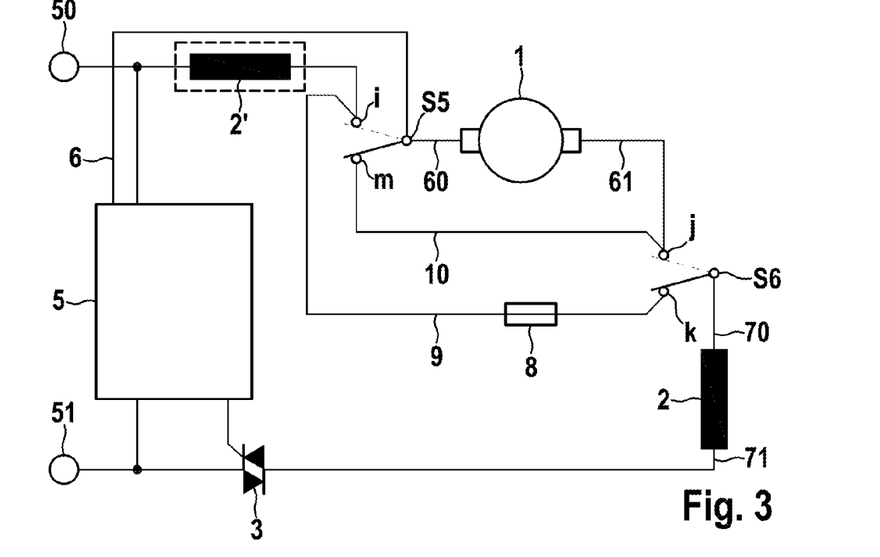

FIG. 3 shows such a solution. The first grid terminal 50 connects to the motor mode contact i of the first switching member S5, and the first terminal 60 of the armature 1 is connected to said first switching member S5, wherein the second terminal 61 of the armature 1 is connected to the motor mode contact j of the second switching member S6. The first terminal 70 of the field winding 2 is connected to said second switching member S6. The second terminal 71 of said field winding is connected to the second power grid terminal 51 via the triac 3. The braking mode contact k of said second switching member S6 is connected to the motor mode contact i of said first switching member S5 via a bridge circuit 9, and said motor mode contact j of said second switching member S6 is connected to the braking mode contact m of said first switching member S5 via a second bridge circuit 10. The connecting cable 6 of the control electronics 5 for detecting the switching position is connected here to the switching member S5.

The armature 1 is connected in series on one side to the field winding 2, or said armature is connected between two field windings, wherein the second field winding part 2' is directly connected to the first power grid terminal 50.

In the off-position of the apparatus switch, which comprises the two change-over switches 55, 56, in FIGS. 1 to 3, the field winding of the universal motor is disconnected from the power grid only by means of a triac 3. A greater operational safety is thereby assured if the universal motor is also additionally disconnected mechanically from said power grid. A respective switch can additionally be provided for this purpose.

Figure 4:
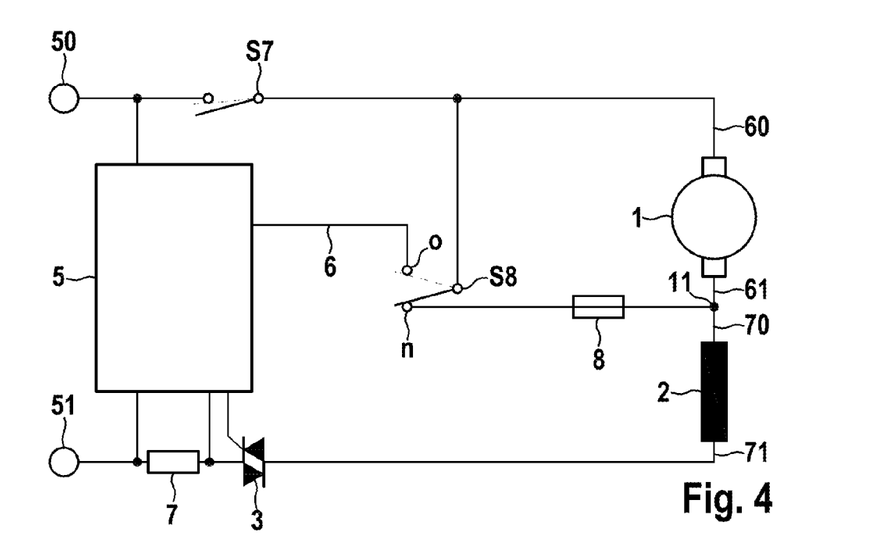

FIG. 4 shows such a solution, wherein a switching member S7 disconnects the first grid terminal after the braking mode has ended. The armature 1 is in this instance connected in series with the field winding 2 on one side and a switching member S8 is connected in parallel with said armature 1. In so doing, the switching member S8 and the first terminal 60 of said armature 1 are connected to the first grid terminal 50, and the braking mode contact n of said switching member S8 is connected to the second terminal 61 of said armature 1 and to the first terminal 70 of the field winding 2 and thereby connected up to the tap 11, wherein a detection contact o of said switching member S8 is connected to the control electronics 5 via a cable 6. The triac 3 is disposed between the second terminal 71 of the field winding 2 and the second power grid terminal 51, i.e. connected downstream of the motor. A shunt 7, with which the amperage (current flow) through the field winding can be acquired, is connected between the triac 3 and the second power grid terminal 51, said shunt also being used in this instance for the closed-loop control of the motor. A fuse 8 is provided for operational safety during the braking mode, which is connected between the first terminal 70 of the field winding 2 and the braking mode contact u.

The switching member S8 and the grid cut-off switching member S7 are, for example, actuated by an apparatus switch. Said switching member S8 has at least one switching delay equal to the time duration of a half-wave of the alternating current of the power grid supply. The grid cut-off switching member S7 has a switching delay equal to at least the duration of the braking mode, i.e. said grid cut-off switching member S7 first opens after the end of said braking mode. Said grid cut-off switching member S7 can, for example, also be switched by the control electronics 5.

In order to be able to carry out a gentle, fast deceleration using an electrodynamic braking device in a universal motor, in which the field winding is connected to the power grid and the armature winding is short-circuited during the braking mode, provision is made for a respective program for the controller of the control electronics. In order to control the current through the field winding 2 in the braking mode, the program comprises an open-loop or closed-loop control via said controller or the triacs. Said program is deposited in a memory, which the control electronics can access. Current controlled by a triac can be controlled by a phase angle control and/or by current limiting.

It must be taken into account with a braking devise of this kind that by supplying the field winding 2 with an alternating current of the power grid, the electrical field is not present at the stator at the same time the field is induced at the armature. The amount of displacement is dependent on many factors. In order to compensate for a temporal displacement of the field at the armature, braking resistors are, for example, connected up in the braking circuit. A braking resistor ought to be, however, variably controllable so that it will perform very effectively.

This degree of complexity is, however, basically not used in a universal motor for electric power tools because the amount of space for such a set-up is not present and the cost factors are too high. According to the invention, an approximate synchronization of the field of the stator and the field of the armature should be achieved by the special control electronics. With the aid of symbolic, graphic depictions, a diagram and recordings, the method is explained in detail.

Figure 5:
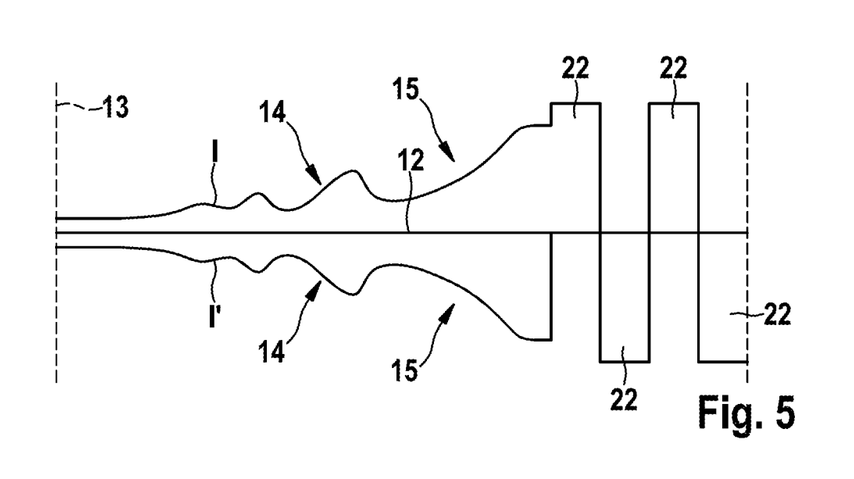
FIGS. 5 to 10 symbolic graphs, diagrams and recordings regarding a current-voltage curve in the field winding during the braking mode, FIGS. 11 to 13 further circuit arrangements of the braking devices.

FIG. 5 shows a symbolic depiction of the current profile in the field winding 2 during the braking mode when the triac 3 or the triacs v, v', v'' are triggered, said profile beginning with a phase angle control having a large firing angle and in the remaining progression thereof having a smaller firing angle, which preferably continuously reduces in size in a uniform manner. Respective control tables are deposited in the memory for this purpose. The zero crossing of an alternating current of the power grid is depicted with a solid line 12, and the amount of power consumed by the field winding during the braking mode is in each case depicted at the sides of this line 12 with the additional lines I, I'. As the power grid delivers an alternating current voltage, the positive and negative values of the alternating current are stated.

At the beginning 13 of the braking mode, a small exciting current I, I'' flows across the field winding, said current then slightly increasing. In a succeeding first range section 14, the exciting current rises and falls in a wavelike manner and in a succeeding second range section 15, the exciting current I, I' continuously increases. In order that a fast and efficient deceleration occurs at the end of the braking mode and the universal motor can come to a stop, the field winding is excited with an alternating current of a lower frequency than the frequency of the power grid. Said alternating current of a lower frequency consists of positive and negative half-wave packets 22. The frequency of the half-wave packets 22 preferably amounts to less than 10 Hz.

A rising and falling of the exciter current in the field winding causes considerable brush sparking at the collector of the short-circuited armature, and an energizing of the field winding with half-wave packets or with a pulsating direct current during the entire braking period is not advantageous because the wear to the brushes is too great.

Figure 6:
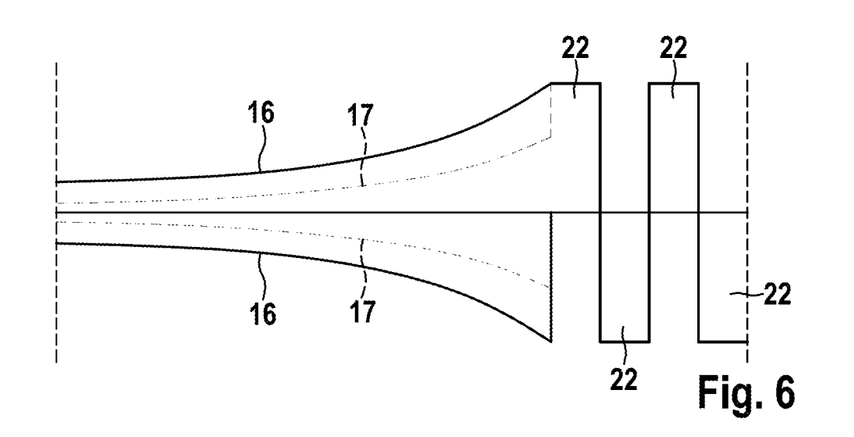

FIG. 6 shows firstly a current consumption 16 by the field winding during the braking mode, which is in total too high, and secondly a current consumption 17 which is too low. Said current consumptions are denoted by a current curve 16 and by a dashed current curve 17.

In order that a uniform current curve can be achieved during the braking mode, the invention makes provision for a current consumption by the field winding, which is controlled in a closed-loop manner.

Figure 7:
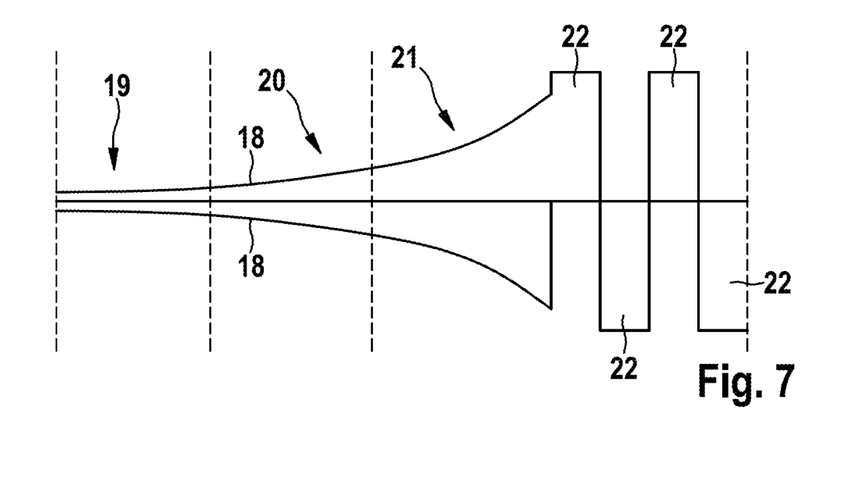

FIG. 7 shows such a closed-loop controlled current curve 18, which flows through the field winding 2, 2' during a braking mode. At the beginning 13 of the braking mode, the alternating current consumption by the field winding begins at the frequency of the power grid and at a current value which is fixedly set low. In the further course of the braking mode in the range sections 19, 20, 21, the current through said field winding 2 is preferably continuously increased up until the beginning of the half-wave packets 22. The closed-loop current control takes place via the shunt 7 of the circuit arrangement, which is evaluated by the controller of the control electronics 5. The triac or triacs are respectively triggered by the program of the controller in order to allow the desired amperage to flow through the field winding. With the aid of the shunt 7, the torque during the motor mode, when a reduction in the idle speed of the universal motor occurs, can also be simultaneously controlled. An overloading of said universal motor and a blockage of the electric power tool can also be effectively ascertained via the shunt 7. In such a case, the current supply to the universal motor is correspondingly decreased or entirely cut off by the control electronics 5.

A respective program and respective data for the braking mode is stored for the controller of the control electronics 5. A gentle and fast deceleration is achieved with only slight brush sparking with said program and said data.

Figure 8:
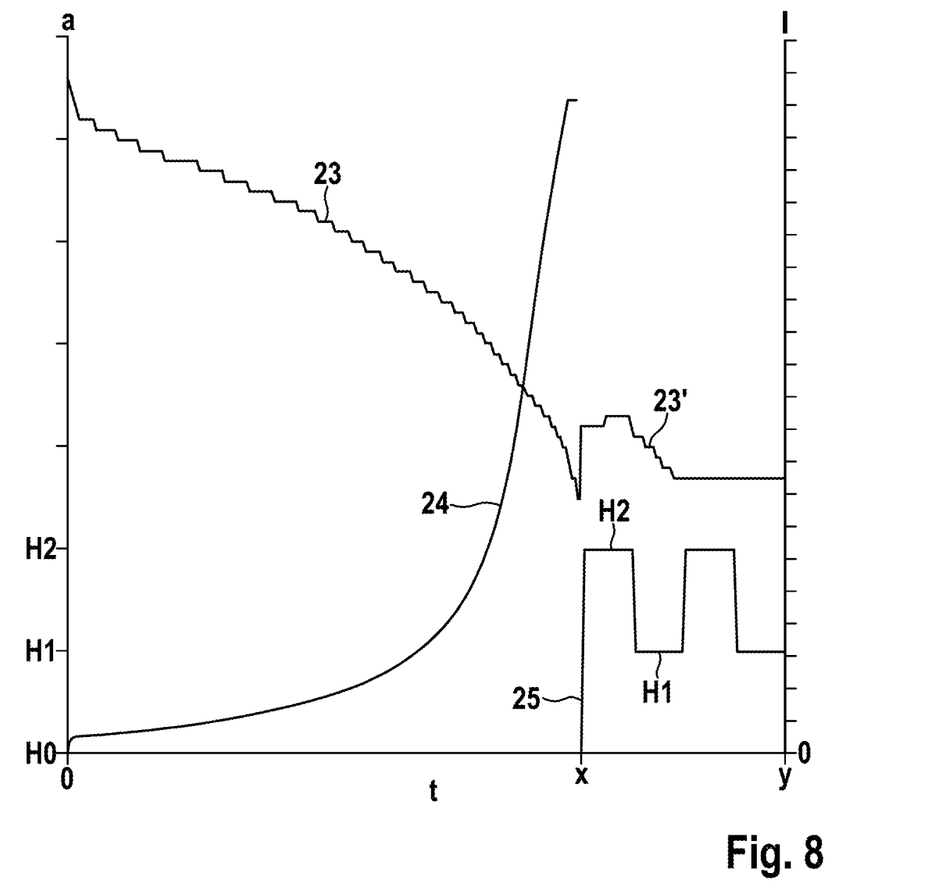

FIG. 8 shows a schematic diagram versus time t with control curves and control data of a program of the controller of the control electronics for the braking mode. A table of a control curve for the phase control angle ∀ of the braking mode is depicted with a first phase control angle curve 23 and the data of a value of a current set point I, wherein the phase control angle curve 23 is selected such that the current set point curve 24 is in principle achieved. With the aid of the phase control angle curve, the phase angles a are predefined, with which the triac or triacs phase-control the alternating current of the power grid, in order to obtain desired voltage and particularly desired current profiles in the field winding. Deviations from the current set point curve 24 are corrected by a current controller, which specifies the amperage that the triac or triacs control through the field winding in the braking mode. In a suitably configured universal motor, a specification of a current set point curve can be dispensed with and then merely a phase control angle curve 23 is specified during the braking mode. The current set point curve 23 can also be achieved without the phase control angle curve 23 but with the current controller by a phase control angle being predefined at said current controller at the beginning of the current set point curve 24. Said current controller is integrated into the control electronics 5 and is active during the braking mode in a time period of 0 until x (H0), the field winding 2, 2' being impressed with an alternating current corresponding to the power grid frequency. Said current controller can be configured as a program or a circuit. Said current controller can furthermore serve to correct a deviation from the current set point curve, which is caused by a drift of the armature field from the stator field and a drift of the reactive current of the motor. A half-wave control is active from a time period from x until y, and the field winding is impressed with an alternating current of a lower frequency than the power grid frequency, corresponding to the half-wave packets H2 and the half-wave packets H1, depicted by a half-wave control curve 25. The half-wave packets are in this instance uncontrolled with respect to the current. In so doing, the amperage of said half-wave packets can also be controlled. The first half-wave control curve 25 is predefined by a second phase control angle curve 23'. The first half-wave packets H2 can be positive, the second half-wave packets H1 being then negative; or said first half-wave packets H2 can be negative, the second half-wave packets H1 being then positive.

Figure 9:
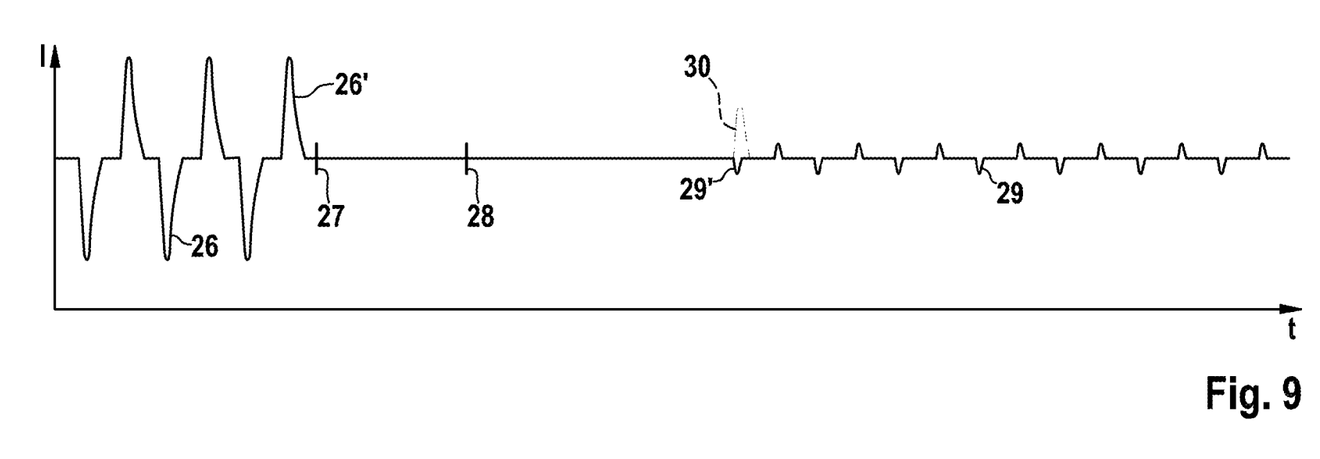

FIG. 9 shows a plotting of a current profile I through the field winding versus the time t of phase-controlled full waves of the voltage signal of the power net during a transition from the motor mode to the braking mode. A no-load operation of the universal motor is depicted by phase-controlled full waves 26 of the power grid. At one reference point 27, a switch is made from the motor mode to the braking mode, and the shifting members S1, S2; S3, S4; S5, S6; S8 of the apparatus switch have lifted off from motor mode contacts. At one reference point 28, said shifting members of the apparatus switch lie against the braking mode contacts. Said shifting members have in this case a switching delay of approximately four half-waves of the power grid frequency. Depending upon the selected embodiment, the switching delay can be shorter or longer.

The controller of the control electronics switches from the motor mode to the braking mode within the switching delay of the switching members. After approximately six half-waves of the power grid frequency, the braking program with the aid of the at least one triac 3, v, v', v" begins with a large phase-cut of the half-waves 29', 29 of the alternating current of the power grid to supply the field winding with an alternating current. In so doing, the braking program can also begin earlier. The program of the controller is configured in such a way that a first half-wave 29' of the alternating current of the field winding has preferably a polarity for the braking mode which is opposite to the polarity of the last half-wave 29' of the alternating current of the field winding in the motor mode. If said motor mode ends with a positive half-wave, said braking mode then preferably begins with a negative half-wave. If said motor mode ends with a negative half-wave, said braking mode preferably begins with a positive half-wave. The half-wave alternation is advantageous because in the case of the half-waves having the same polarity during a change from the motor mode to the braking mode, the current flow of the first half-wave 29' through the field winding 2, 2' can be very high at the beginning of said braking mode, denoted by the dashed half-wave 30, and can cause a somewhat substantial arc at the collector of the armature.

Figure 10:
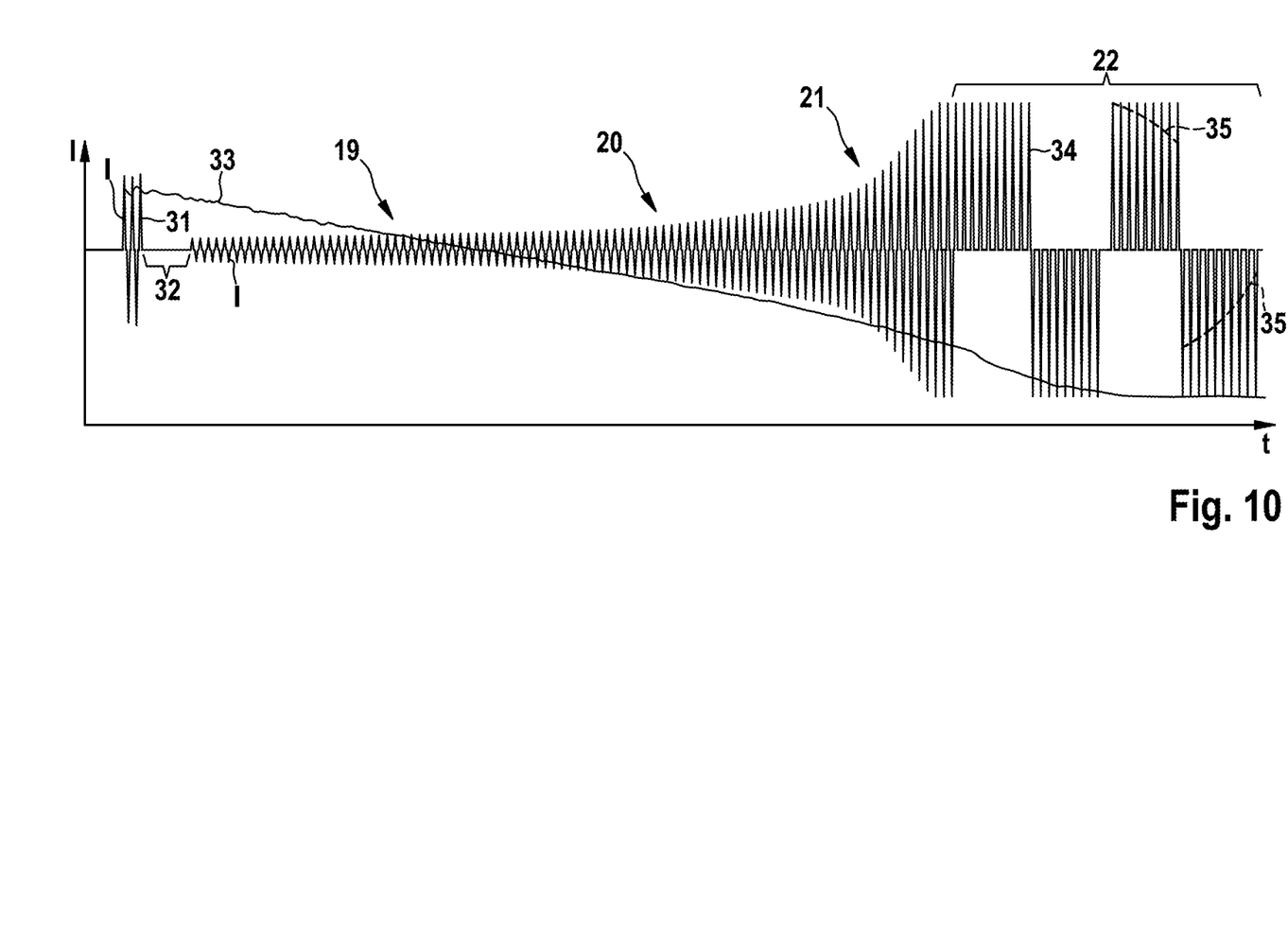

FIG. 10 shows a plotting of a current profile I versus the time t in the field winding 2 during the braking mode of the universal motor. The current is delivered by the alternating current voltage of the power grid and represent an alternating current. A no-load operation is depicted by a plotted current I of phase-controlled full waves 31 of the power grid voltage. At least one zero crossing of the grid voltage lies between a switching from the motor mode to the braking mode. After a switching time 32 from the motor mode to the braking mode, the current consumption I in the field winding 2, 2' is preferably low in the beginning. In the further profile of the current, said current I of the power grid preferably continuously increases only slightly in the first range section 19 and preferably increases somewhat more considerably in the second range section 20 and preferably increases sharply in the third range section 21. In so doing, the rotational speed curve 33 has an approximately linearly dropping profile, whereby the rotational speed of the universal motor during the braking mode preferably continuously decreases in a uniform manner. The current consumption has thereby a progressive profile in the field winding. Depending upon the selected embodiment, other current profiles and rotational speed profiles can also be selected.

In the fourth range section 22, the alternating current consumption in the field winding occurs at a lower frequency, wherein positive and negative half-wave packets of the alternating current of the power grid are present at the field winding. A half-wave packet comprises a plurality of positive or negative voltage pulses having positive or negative current. The voltage pulses are obtained, i.e. filtered, from the alternating current of the power grid by a corresponding triggering of the at least one triac 3. The frequency of the change in the polarity of the energization of the field winding with the half-wave packets can, for example, be half as great as the power grid frequency and smaller, for example, down to a tenth of said power grid frequency. During a half-wave packet, a plurality of voltage pulses of the same polarity as the power grid voltage is applied to the field winding. Subsequently a certain number of the voltage pulses of the opposite polarity of the power grid voltage are applied to the field winding during the succeeding half-wave packet. A half-wave packet can thereby have, for example, 2 to 10 or multiple voltage pulses of the same polarity. The rotational speed 33 of the universal motor continuously decreases preferably in a uniform manner during the braking mode up until the half-wave packets 22. The rotational speed is more substantially reduced by said half-wave packets and the motor quickly comes to a stop. Said half-wave packets preferably change the polarity sequence thereof when restarting the universal motor by, for example, the first half-wave packet 34 comprising positive half-waves during a deceleration of said universal motor and negative half-waves during a succeeding deceleration of said universal motor. In so doing, the brushes of the commutator of the armature will be evenly worn.

Because, depending on the structure of the universal motor, the inductive field at the armature can be greater than the induced field at the end of the braking mode, the field present at the field winding can drive said armature of the universal motor at the end of the braking period. For that reason, it can be advantageous to reduce, preferably to sharply reduce, the current consumption of the field winding at the end of the brake period. The reduction of the current is depicted by the dashed line 35. Said reduction of the current consumption can extend over one, two or a plurality of last half-wave packets. In a further embodiment, the power grid can be turned off prematurely.

In order to further reduce the wear to the brushes in a braked universal motor, the rotational speed at no-load conditions can be reduced into the range of the nominal operation of the universal motor, a rotational speed detection device being then associated with said universal motor. A reduction in the rotational speed under no-load conditions is particularly advantageous in the case of angle grinders and hand-held circular saws because a secure application of the tool to the work material is facilitated. As soon as the tool is placed under load, the torque is readjusted according to the load of said tool.

Figure 11:
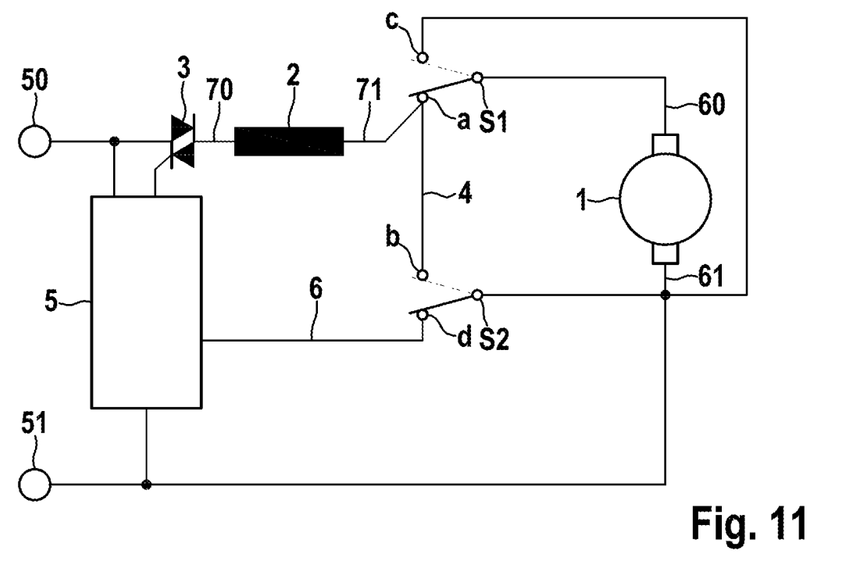

FIG. 11 shows a further embodiment of the circuit arrangement, in which a triac 3 is connected to a first power grid terminal 50 and to a first terminal 70 of a field winding 2, and a second terminal 71 of the field winding 2 connects to a motor mode contact a of a first switching member 51; and a first terminal 60 of an armature 1 connects to the first switching member 51, wherein a braking mode contact b of the second switching member S2 is connected to the motor mode contact a of said first switching member 51 by means of a bridge circuit 4. Control electronics 5 are assigned to the triac 3. In order for the control electronics 5 to detect when a motor mode or a braking mode has been switched on via the switching members 51, S2, a cable 6 leads from a detection contact d of the second switching member S2 to said control electronics 5. In addition, a braking contact c of said first switching member 51 is connected to a second terminal 61 of the armature 1. The second terminal 61 of said armature 1 is connected to the second power grid terminal 51.

In the circuit arrangement of FIG. 11, the triac 3 is connected upstream of a universal motor. Said triac 3 can also be connected downstream of the universal motor.

Figure 12:
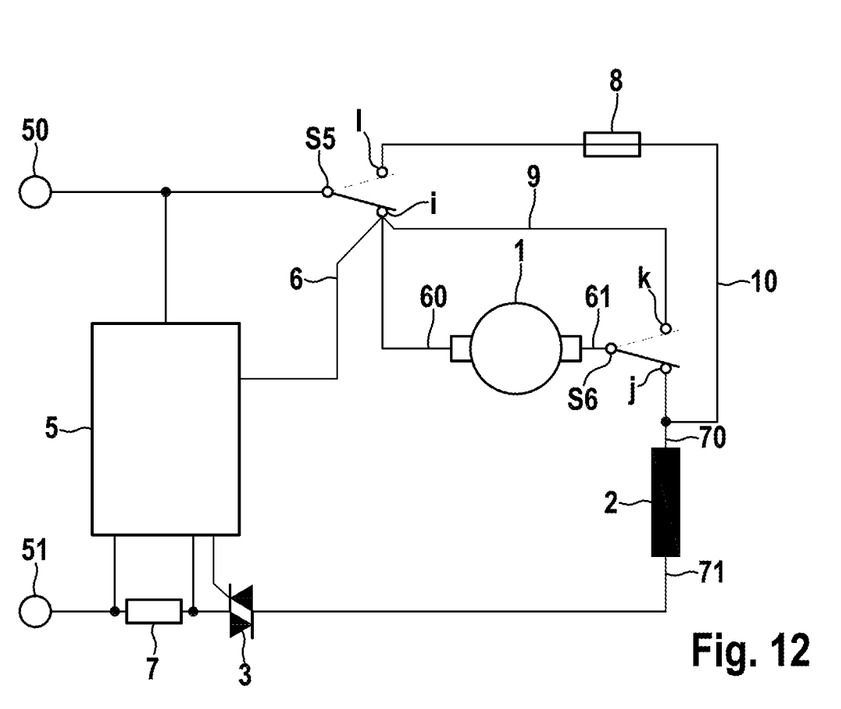

FIG. 12 shows a further embodiment of the circuit arrangement. The first power grid terminal 50 connects to a first switching member S5 and the first terminal 60 of the armature 1 is connected to a motor mode contact i of the first switching member S5, wherein the second terminal of said armature 1 is connected to a second switching member S6, and the first terminal 70 of the field winding 2 is connected to a motor mode contact j of the second switching member S6, wherein the second terminal 71 of said field winding 2 connects to the second power grid terminal 51 via a triac 3. A braking mode contact k of said second switching member S6 is connected to the motor mode contact i of said first switching member S5 via a bridge circuit 9, and the motor mode contact j of said second switching element S6 is connected to a braking mode contact l of said first switching member S5. Said motor mode contact i of said first switching member S5 is also in this case simultaneously in detection contact, whereat the cable 6 of said control electronics 5 is connected to detect the switch setting.

Figure 13:
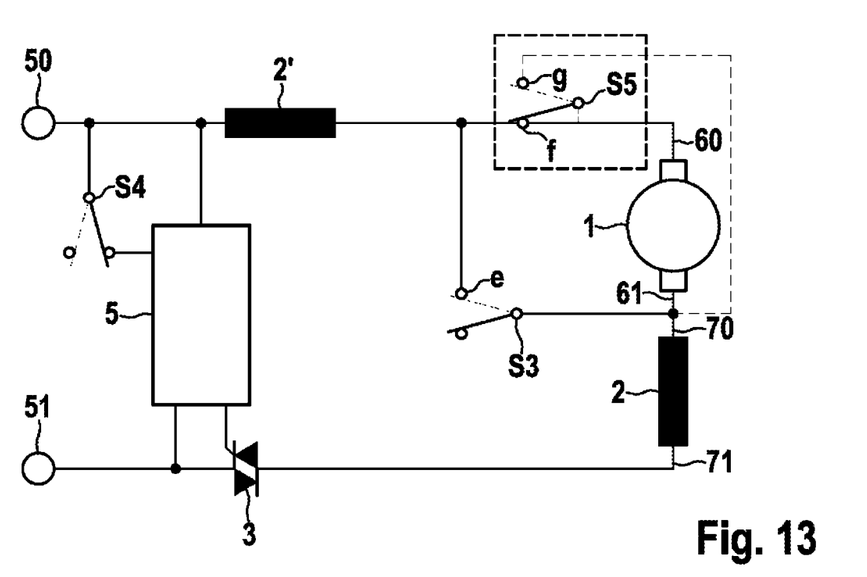

FIG. 13 shows a further circuit arrangement. The one part of the field winding 2' is connected to the power grid terminal 50 and the other part of the field winding 2 is connected to the second power grid terminal 51 via the triac 3. A switching member S3 is connected in parallel with the armature 1, wherein the braking mode contact e is connected to the first terminal 60 of said armature 1 and the switching member S3 is connected to the second terminal 61 of said armature 1.

A switching member S4, which is directly connected to the first power grid terminal 50, is associated with the control electronics 5 for detecting the motor mode and the braking mode. The switching members of the circuit arrangements depicted in said circuit arrangements are synchronously actuated.

In the circuit arrangement of FIG. 13, the motor mode cannot be switched off when the triac 3 malfunctions, if a fuse is connected in series with the field winding during the braking mode and the fuse blows.

A mechanical shut-off of the motor mode is also facilitated when a fuse is connected in series with the field winding, if a switching member S5 is associated with the armature 1 for this purpose. The one part of the field winding 2 is then connected up at the motor mode contact f of the switching member S5, and said motor mode contact f of said switching member S5 is connected to the braking mode contact e of the switching member S3 via a bridge circuit, wherein said switching member S5 is connected to the first terminal 60 of the armature 1 and the braking mode contact g of said switching member S5 is connected to the second terminal 61 of said armature 1.

The control electronics 5 are connected to the triacs 3, v, v', v'', 1 in the circuit arrangements of FIGS. 1 to 4 and 11 to 13. Said control electronics 5 control the current flow through the triacs pursuant to the deposited tables and/or diagrams. The control of the triacs can, for example, occur as a function of the time and/or as a function of the rotational speed of the armature and/or as a function of the amperage of the current through the field winding in the braking mode. A triac constitutes a controllable switch.

In a further embodiment, the armature 1 is bilaterally separated from the power grid by the switching of the appropriate switching members.

In a further embodiment, the control curve of the phase control angle curve 26 and the control data of the current set point of the current set point curve 27 are in each case formed with a table or with a mathematical function of the program of the controller.

In a further embodiment, the current consumption in the field winding 2 after switching to the braking mode is less than the current consumption during no-load conditions of the motor.

In a further embodiment, the time delay for the beginning of the braking program by the control electronics 5 is greater than the delay of the switching members.

In a further embodiment, the invention relates to an electrodynamic braking device for a universal motor having a field winding 2 and an armature 3 and having a circuit arrangement comprising at least one part of the following features: having at least one triac 1 and control electronics 5 comprising a controller and having an apparatus switch comprising switching members for switching from a motor mode to a braking mode, wherein the field winding 2 is fed from a power grid and the armature is short-circuited during the braking mode, the controller contains a program for controlling the motor mode and the braking mode and the program of the controller for reducing brush sparking during the braking mode is configured such that, in the case of a disposal of an apparatus switch having non-delayed switching members S3, S4 for the reliable detection of the switch setting, the circuit arrangement contains an additional triac 1', wherein the first triac 1 is specified for the motor mode and the second triac 1' is specified for the braking mode, after switching to the braking mode and thereby to an off-position of the apparatus switch, the armature 3 is short-circuited by the non-delayed switching members S3, S4 and said armature is bilaterally separated from the power grid by said switching members S3, S4, after switching to the braking mode, a braking program of the controller of the control electronics 5 is activated, with which the second triac 1' is triggered, during the braking mode, the field winding 2 is excited via the second triac 1' and after a completion of the braking program, the field winding 2 is disconnected from the power grid by the second triac 1'.

In a further embodiment, an actual current value, consisting of an active current and a reactive current of the motor, is ascertained for the current controller of the control electronics 5, and the current set point curve 27 is achieved by the current controller with the aid of the phase control angle curve 26, or said current set point curve 27 is achieved directly with the current controller by a phase control angle being predefined for the current controller at the beginning of the braking mode.

The invention claimed is:
1. An electrodynamic braking device for a universal motor having a field winding (2, 2') and an armature (1), having a switching device (S1-S6, S8, 3, v, v', v") for switching from a motor mode to a braking mode, wherein the braking device is designed to supply the armature (1) and the field winding (2, 2') with an alternating current of a power grid (50, 51) during the motor mode,
   wherein said braking device is designed to short circuit said armature (1) and to continue to supply said field winding (2, 2') with an alternating current from the power grid (50, 51) during the braking mode,
   wherein said braking device is designed to supply said field winding (2, 2') with a current having an A.C. voltage which has the frequency of said power grid in a first phase of said braking mode and
   wherein said braking device is designed to supply the field winding (2, 2') with an alternating current from said power grid which has a frequency that is reduced with respect to the frequency of said power grid in a further phase of the braking mode.

2. The braking device according to claim 1, wherein the device is designed to supply the field winding in a further phase with half-wave packets from a plurality of voltage pulses having the same polarity as the power grid, said polarity of the voltage pulses changing from one half-wave packet to a following half-wave packet.

3. The braking device according to claim 2, wherein the device is designed to apply the voltage pulses of at least the first half-wave packet to the field winding without limiting current from the power grid.

4. The braking device according to claim 2, wherein the device is designed to control the current of the voltage pulses of the half-wave packets as a function of predefined parameters.

5. The braking device according to claim 4, wherein the device is designed to reduce the current of the voltage pulses from voltage pulse to voltage pulse in at least one half-wave packet in temporally consecutive voltage pulses.

6. The braking device according to claim 1, wherein the device is designed to control the current through the field winding in an open- or closed-loop manner during the initial phase of the braking mode using a current set point curve.

7. The braking device according to claim 1, wherein the device is designed to execute the switching from the motor mode to the braking mode in such a fashion that a zero crossing of the alternating current of the power grid occurs; thus enabling a first half-wave of the braking mode to have an opposite polarity with respect to a last half-wave of the motor mode.

8. The braking device according to claim 1, wherein the device is designed to change the polarity of the first half-wave in the case of consecutive braking modes.

9. The braking device according to claim 1, wherein the device is designed to set up at least two periods having different levels of current through the field winding in the initial phase of the braking mode.

10. The braking device according to claim 9, wherein the device is designed to adjust a current through the field winding, which slightly increases over time, in a first period of the initial phase, to adjust a current through said field winding, which more sharply increases over time than in the first period, in a succeeding second period, to adjust a current through said field winding, which more sharply increases than in the second period, in a succeeding third period of the initial phase.

11. The braking device according to claim 1, wherein the device comprises a detection link (6) to a switching member (S1, S2, S3, S4, S5, S8) for detecting a motor mode or a braking mode, wherein an electrically conductive connection between the armature (1) and the field winding (2) or between said armature (1) and/or said field winding (2) and the power grid (50, 51) can be established or interrupted with the switching member (S1, S2, S3, S4, S5, S8).

12. The braking device according to claim 1, wherein the device comprises a switching device, with which an electrically conductive connection can be established or interrupted between the terminals of the armature (1) and/or between the armature (1) and the field winding (2) and/or between the armature (1) and/or the field winding (2) and terminals of the power grid (50, 51) in order to switch from the motor mode to the braking mode, the switches (S1-S8) having a switching delay of at least a half-wave of the alternating current of the power grid.

13. The braking device according to claim 1, wherein the device comprises control electronics (5), said control electronics during the motor mode being connected via a detection link (6) directly to a power grid terminal (50) by a switching member (S1-S6, S8) or being connected via a switching element (S1-S6, S8) and the field winding (2) to a power grid terminal (51), wherein the armature (1) is bilaterally disconnected from the power grid (50, 51) by two switching members (S1, S2; S3, S4) after switching from the motor mode to the braking mode, the field winding (2) being disconnected from the power grid by a switching device (3) after the braking mode has ended.

14. The braking device according to claim 1, wherein three further switching devices (v, v', v") are provided for a bilateral mechanical separation of the armature having non-delayed change-over switches (S3, S4), a first switching device (v) being connected in series with the universal motor (1,2) via a first change-over switch (S3) during the motor mode, a second switching device (v') being connected in series with the field winding (2) via a second change-over switch (S4) during the braking mode and a third switching device (v") being connected in a short-circuit bridge (w) between the terminals (60,61) of the armature (1).

15. A method for braking a universal motor having a field winding and an armature, wherein the universal motor can be switched from a motor mode to a braking mode,
   wherein the armature and the field winding are supplied with an alternating current of a power grid during the motor mode,
   wherein said armature is short-circuited and said field winding continues to be supplied with an alternating current by the power grid during the braking mode,
   wherein said field winding is supplied with an alternating current having the frequency of said power grid in an initial phase of the braking mode and
   wherein said field winding is supplied by said power grid with an alternating current having a frequency that is reduced with respect to the frequency of said power grid after the initial phase of the braking mode in a further phase of said braking mode.

16. The method according to claim 15, wherein the field winding is supplied in the further phase of the braking mode with half-wave packets from in each case a plurality of voltage pulses having the same polarity as the power grid, the polarity of the voltage pulses changing from half-wave package to half-wave package.

17. The method according to claim 16, wherein the voltage pulses of the at least one half-wave packet are applied to the field winding without current limiting.

18. The method according to claim 16, wherein the current of the voltage pulses of the half-wave packets can be controlled in an open-loop or closed-loop manner as a function of predefined parameters.

19. The method according to claim 18, wherein the current of the voltage pulses is reduced from voltage pulse to voltage pulse in at least one half-wave packet in temporally consecutive voltage pulses.

20. The method according to claim 15, wherein the current through the field winding is controlled in an open-loop or closed-loop manner during the initial phase of the braking mode using a current set point curve.

21. The method according to claim 15, wherein the switching from the motor mode to the braking mode is executed in a manner such that a zero crossing of the alternating current of the power grid occurs between the change from the motor mode to the braking mode; thus enabling a first half-wave of said braking mode to have an opposite polarity with respect to a last half-wave of the motor mode.

22. The method according to claim 15, wherein the polarity of first half-wave of the braking mode is changed when consecutive braking modes occur.

23. The method according to claim 15, wherein at least two periods having different levels of current through the field winding are set up in the initial phase of the braking mode.

24. The method according to claim 23, wherein a current through the field winding slightly increasing over time is adjusted in a first period of the initial phase, wherein a current increasing more sharply over time than in the first period is adjusted in a successive second period and wherein a current through the field winding increasing more sharply in comparison to the second period is adjusted in a successive third period of the initial phase in order to obtain a rotational speed curve of the armature, which linearly drops.

* * * * *

UNITED STATES PATENT AND TRADEMARK OFFICE
CERTIFICATE OF CORRECTION

PATENT NO. : 8,541,963 B2  Page 1 of 1
APPLICATION NO. : 13/254476
DATED : September 24, 2013
INVENTOR(S) : Hans Hermann Rottmerhusen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 198 days.

Signed and Sealed this
Fifteenth Day of September, 2015

Michelle K. Lee
*Director of the United States Patent and Trademark Office*